(12) United States Patent
Park et al.

(10) Patent No.: US 11,812,479 B2
(45) Date of Patent: Nov. 7, 2023

(54) METHOD AND APPARATUS FOR RANDOM ACCESS IN COMMUNICATION SYSTEM

(71) Applicant: ELECTRONICS AND TELECOMMUNICATIONS RESEARCH INSTITUTE, Daejeon (KR)

(72) Inventors: Ji Soo Park, Daejeon (KR); Il Gyu Kim, Daejeon (KR); Hee Sang Chung, Daejeon (KR); Yong Seouk Choi, Daejeon (KR); Jun Hyeong Kim, Daejeon (KR); Go San Noh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 79 days.

(21) Appl. No.: 17/517,769

(22) Filed: Nov. 3, 2021

(65) Prior Publication Data

US 2022/0150985 A1 May 12, 2022

(30) Foreign Application Priority Data

Nov. 6, 2020 (KR) .................. 10-2020-0148151
Oct. 20, 2021 (KR) .................. 10-2021-0140367

(51) Int. Cl.
*H04W 74/08* (2009.01)
*H04W 74/00* (2009.01)

(52) U.S. Cl.
CPC ..... *H04W 74/0841* (2013.01); *H04W 74/006* (2013.01); *H04W 74/0866* (2013.01)

(58) Field of Classification Search
CPC ............... H04W 72/04; H04W 74/006; H04W 74/0841; H04W 74/0866
See application file for complete search history.

(56) References Cited

U.S. PATENT DOCUMENTS

| | | | |
|---|---|---|---|
| 8,477,712 B2 | 7/2013 | Hao et al. | |
| 10,687,366 B2 | 6/2020 | Hui et al. | |
| 10,772,132 B2 | 9/2020 | Zhang et al. | |
| 2009/0316586 A1* | 12/2009 | Yi | H04W 74/002 370/242 |
| 2014/0044067 A1* | 2/2014 | Lin | H04W 24/10 370/329 |
| 2018/0279364 A1* | 9/2018 | Hui | H04W 74/085 |

(Continued)

*Primary Examiner* — Kashif Siddiqui
(74) *Attorney, Agent, or Firm* — LRK PATENT LAW FIRM

(57) ABSTRACT

An operation method of a terminal in a communication system may include: receiving, from a base station, primary RA configuration information for a primary RA procedure; receiving, from the base station, secondary RA configuration information for a secondary RA procedure; transmitting a primary RA preamble to the base station by using a primary RA resource indicated by the primary RA configuration information; receiving, from the base station, secondary RA indication information in response to the primary RA preamble, the secondary RA indication information indicating to perform the secondary RA procedure instead of the primary RA procedure; and transmitting a secondary RA preamble to the base station by using a secondary RA resource indicated by the secondary RA configuration information.

17 Claims, 8 Drawing Sheets

(56) References Cited

U.S. PATENT DOCUMENTS

| | | |
|---|---|---|
| 2019/0159259 A1 | 5/2019 | Kim et al. |
| 2020/0015285 A1* | 1/2020 | Shin .................. H04W 52/50 |
| 2020/0068620 A1 | 2/2020 | Kim et al. |
| 2020/0252962 A1 | 8/2020 | Vajapeyam et al. |
| 2020/0329510 A1 | 10/2020 | Sun et al. |
| 2020/0382970 A1 | 12/2020 | Dimou et al. |
| 2021/0037577 A1 | 2/2021 | Lei et al. |

* cited by examiner

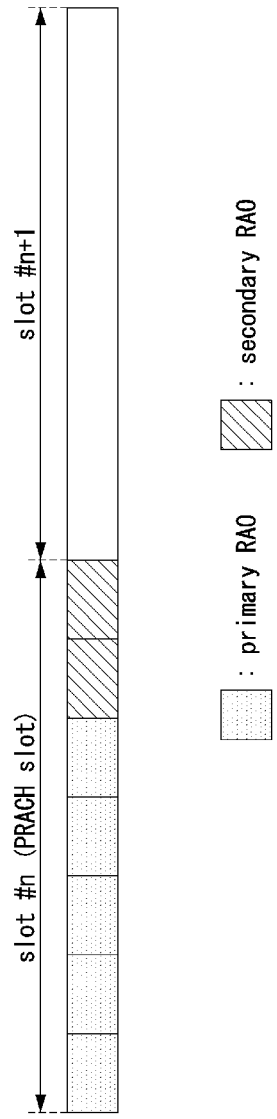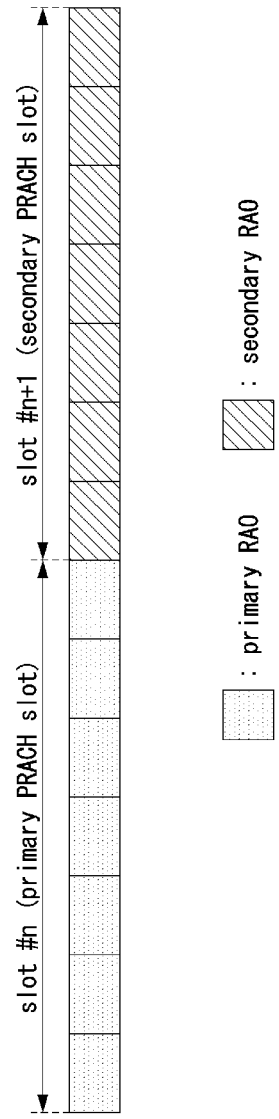

METHOD AND APPARATUS FOR RANDOM ACCESS IN COMMUNICATION SYSTEM

CROSS-REFERENCE TO RELATED APPLICATIONS

This application claims priority to Korean Patent Application No. 10-2020-0148151 filed on Nov. 6, 2020, and No. 10-2021-0140367 filed on Oct. 20, 2021 with the Korean Intellectual Property Office (KIPO), the entire contents of which are hereby incorporated by reference.

BACKGROUND

1. Technical Field

The present disclosure relates to a technique for random access in a communication system, and more particularly, to a random access technique for processing random access requests of a plurality of terminals.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

In the communication system (e.g., 4G communication system or 5G communication system), a random access procedure may be performed for synchronization acquisition, power control, uplink resource request, system information request, addition of a secondary cell according to carrier aggregation, beam failure recovery (BFR), and/or handover. In the random access procedure, a terminal may transmit a random access (RA) preamble to a base station on a physical random access channel (PRACH). In particular, a plurality of terminals may transmit the same RA preambles to the base station on the same PRACH. In this case, the base station may transmit one random access response (RAR) to the terminals in response to the RA preambles. Therefore, even though a plurality of terminals attempt random access, only a random access procedure for one terminal can be performed.

The proportion of PRACH resources among uplink resources may be high. As the proportion of PRACH resources increases, the cost may increase. Accordingly, increasing the PRACH resources (e.g., RA occasions) in order to improve the performance of the RA procedure may be limited. Irrespective of a transmission load of the RA preamble, many resource blocks may be occupied (e.g., reserved) for the PRACH, and thus unnecessary radio resources may be wasted. In particular, when a time division duplex (TDD) frame structure is used, reserved PRACH resources may affect a ratio of uplink and downlink. Therefore, methods for efficiently managing PRACH resources may be required.

SUMMARY

Accordingly, exemplary embodiments of the present disclosure are directed to providing methods and apparatuses for efficiently operating PRACH resources in a communication system.

According to a first exemplary embodiment of the present disclosure, an operation method of a terminal in a communication system may comprise: receiving, from a base station, primary random access (RA) configuration information for a primary RA procedure; receiving, from the base station, secondary RA configuration information for a secondary RA procedure; transmitting a primary RA preamble to the base station by using a primary RA resource indicated by the primary RA configuration information; receiving, from the base station, secondary RA indication information in response to the primary RA preamble, the secondary RA indication information indicating to perform the secondary RA procedure instead of the primary RA procedure; and transmitting a secondary RA preamble to the base station by using a secondary RA resource indicated by the secondary RA configuration information.

The secondary RA configuration information may be received from the base station before transmitting the primary RA preamble, before receiving a response to the primary RA preamble, or in a procedure of receiving the response to the primary RA preamble.

Each of the primary RA resource and the secondary RA resource may include at least one of a physical random access channel (PRACH) occasion, an RA preamble index, or a reference signal index (RSI).

The secondary RA resource may be configured independently of the primary RA resource, or the secondary RA resource may be configured to overlap the primary RA resource.

The secondary RA configuration information may be received through at least one of system information, a radio resource control (RRC) message, a medium access control (MAC) control element (CE), a primary random access response (RAR) that is a response to the primary RA preamble, or downlink control information (DCI).

The secondary RA indication information may be included in a DCI scrambled by an RA-radio network temporary identifier (RA-RNTI) determined based on a transmission resource of the primary RA preamble or may be included in a primary RAR that is a response to the primary RA preamble.

The secondary RA resource indicated by the secondary RA configuration information may be activated when the secondary RA indication information is received.

The operation method may further comprise receiving secondary RA valid time information from the base station, wherein the secondary RA resource activated by the secondary RA indication information is used during a valid time indicated by the secondary RA valid time information.

According to a second exemplary embodiment of the present disclosure, an operation method of a base station in a communication system may comprise: transmitting primary RA configuration information for a primary RA procedure; transmitting secondary RA configuration information for a secondary RA procedure; receiving a primary RA preamble from a terminal by using a primary RA resource indicated by the primary RA configuration information;

transmitting secondary RA indication information to the terminal, the secondary RA indication information indicating to perform the secondary RA procedure instead of the primary RA procedure; and receiving a secondary RA preamble from the terminal by using a secondary RA resource indicated by the secondary RA configuration information.

The secondary RA configuration information may be transmitted to the terminal before receiving the primary RA preamble, before transmitting a response to the primary RA preamble, or in a procedure of transmitting the response to the primary RA preamble.

Each of the primary RA resource and the secondary RA resource may include at least one of a physical random access channel (PRACH) occasion, an RA preamble index, or a reference signal index (RSI).

The secondary RA configuration information may be transmitted through at least one of system information, a radio resource control (RRC) message, a medium access control (MAC) control element (CE), or downlink control information (DCI).

The secondary RA indication information may be transmitted through a DCI scrambled by an RA-radio network temporary identifier (RA-RNTI) determined based on a transmission resource of the primary RA preamble or through a primary random access response (RAR) that is a response to the primary RA preamble.

The secondary RA resource indicated by the secondary RA configuration information may be activated when the secondary RA indication information is transmitted.

The operation method may further comprise transmitting secondary RA valid time information, wherein the secondary RA resource activated by the secondary RA indication information is used during a valid time indicated by the secondary RA valid time information.

According to a third exemplary embodiment of the present disclosure, a terminal in a communication system may comprise: a processor; a memory electronically communicating with the processor; and instructions stored in the memory, wherein when executed by the processor, the instructions cause the terminal to: receive, from a base station, primary RA configuration information for a primary RA procedure; receive, from the base station, secondary RA configuration information for a secondary RA procedure; transmit a primary RA preamble to the base station by using a primary RA resource indicated by the primary RA configuration information; receive, from the base station, secondary RA indication information in response to the primary RA preamble, the secondary RA indication information indicating to perform the secondary RA procedure instead of the primary RA procedure; and transmit a secondary RA preamble to the base station by using a secondary RA resource indicated by the secondary RA configuration information.

The secondary RA configuration information may be received from the base station before transmitting the primary RA preamble, before receiving a response to the primary RA preamble, or in a procedure of receiving the response to the primary RA preamble.

The secondary RA configuration information may be received through at least one of system information, a radio resource control (RRC) message, a medium access control (MAC) control element (CE), a primary random access response (RAR) that is a response to the primary RA preamble, or downlink control information (DCI).

The secondary RA indication information may be included in a DCI scrambled by an RA-radio network temporary identifier (RA-RNTI) determined based on a transmission resource of the primary RA preamble or may be included in a primary RAR that is a response to the primary RA preamble.

The instructions may further cause the terminal to receive secondary RA valid time information from the base station, and when the secondary RA indication information is received, the secondary RA resource may be activated during a valid time indicated by the secondary RA valid time information.

According to the exemplary embodiments of the present disclosure, primary random access (RA) resources and secondary RA resources may be configured. When specific condition(s) are satisfied, a secondary RA procedure (e.g., supplementary RA procedure) may be performed instead of a primary RA procedure. The secondary RA procedure may be performed using the secondary RA resources. In this case, a load of the RA procedure may be reduced, and waste of uplink resources may be reduced. In addition, a success probability of the RA procedure can be improved, and reliability and performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which:

FIG. 8 is a conceptual diagram illustrating a first exemplary embodiment of a method of configuring RAOs in a communication system.

FIG. 9 is a conceptual diagram illustrating a second exemplary embodiment of a method of configuring RAOs in a communication system.

DETAILED DESCRIPTION OF THE EMBODIMENTS

Figure 1:
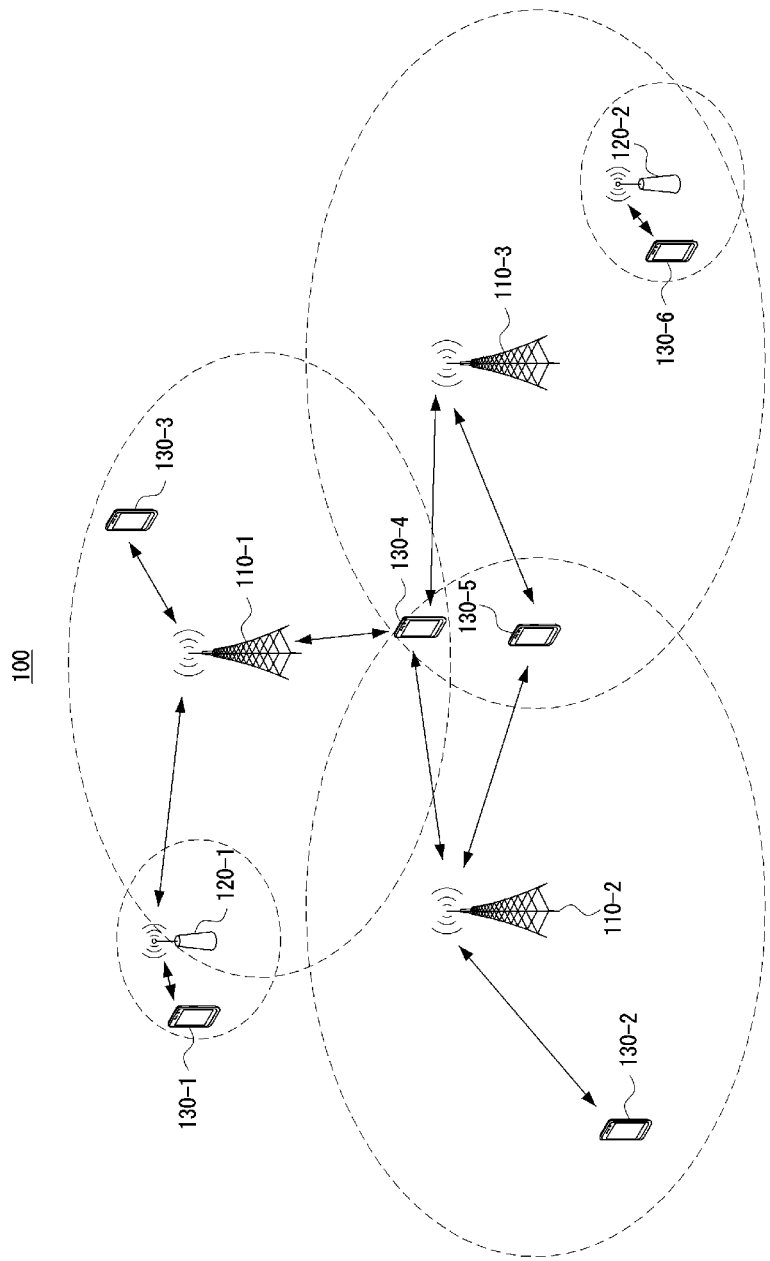
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
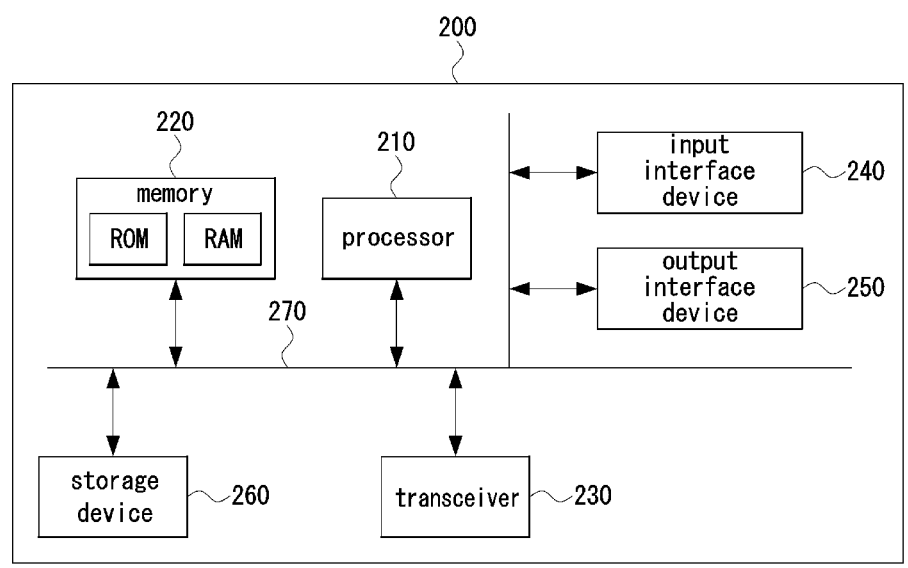
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

The base station and the terminal may perform communication using an omnidirectional beam, a sector beam, or a spot beam. The omni-directional beam may be formed using an omni-directional antenna, and the spot beam may be formed using a beamforming antenna.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the communication system (e.g., 4G communication system or 5G communication system), a random access procedure may be performed for synchronization acquisition, power control, uplink resource request, and/or handover. The RA resources may include a PRACH occasion (RAO) used for transmission and reception of an RA preamble, an RA preamble index (i.e., RAPIdx) used to identify the RA preamble, and/or a reference signal index (RSI) used for beam mapping. The RA preamble may be configured with a sequence having autocorrelation characteristics. The RSI may be a synchronization signal block (SSB) index (e.g., SS/PBCH block index) and/or a channel state information reference signal (CSI-RS) index. The random access procedure between the base station and the terminal may be distinguished by the RA resources (e.g., RAO and RAPIdx).

The RAO may be a time-frequency resource for transmission and reception of an RA preamble. The length of the RAO in the time domain may vary according to a subcarrier spacing, preamble format, and the like. For example, the length of the RAO in the time domain may be the length of one or more symbols, one or more slots, or a subframe. In the frequency domain, the RAO may be composed of one or more subcarriers within a system bandwidth (e.g., bandwidth part).

Figure 3:
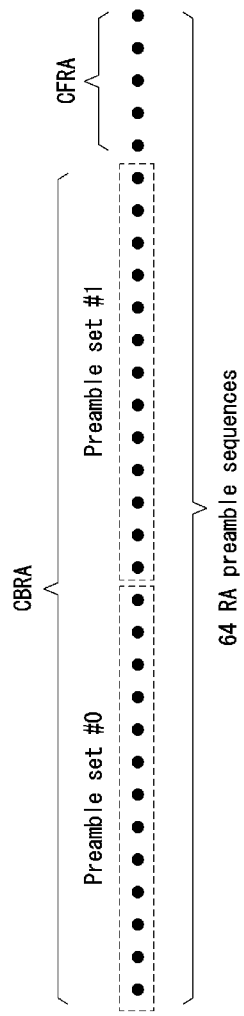
FIG. 3 is a conceptual diagram illustrating a first exemplary embodiment of an RA preamble sequence in a communication system.

FIG. 3 is a conceptual diagram illustrating a first exemplary embodiment of an RA preamble sequence in a communication system.

Referring to FIG. 3, 64 RA preamble sequences may be configured for each cell. Among the 64 RA preamble sequences, some RA preamble sequences may be used for a contention-based random access (CBRA) procedure, and the remaining RA preamble sequences may be used for a contention-free random access (CFRA) procedure. The RA preamble sequences used for the CBRA procedure may be classified into two sets (e.g., preamble set #0 and preamble set #1). The base station may transmit configuration information of the preamble sets #0 and #1 to the terminal. The configuration information of the preamble sets #0 and #1 may be included in a radio resource control (RRC) message and/or system information.

When the CBRA procedure is performed, the terminal may randomly select one RA preamble sequence from the preamble set #0 or #1. The terminal may generate an RA preamble using the selected RA preamble sequence, and may transmit the generated RA preamble to the base station through a PRACH. The preamble set used by the terminal may be determined based on the size of data to be transmitted through an RA MSG #3 and/or a transmission power of the terminal. For example, when the size of data to be transmitted through the RA MSG #3 is greater than or equal to a threshold, the terminal may transmit an RA preamble generated by using an RA preamble sequence selected from the preamble set #0 to the base station. When the size of data to be transmitted through the RA MSG #3 is less than the threshold, the terminal may transmit an RA preamble generated by using an RA preamble sequence selected from the preamble set #1 to the base station. In this case, the base station may refer to the preamble set to which the RA preamble sequence received from the terminal belongs to determine the size of an uplink resource to be allocated to the terminal.

Figure 4:
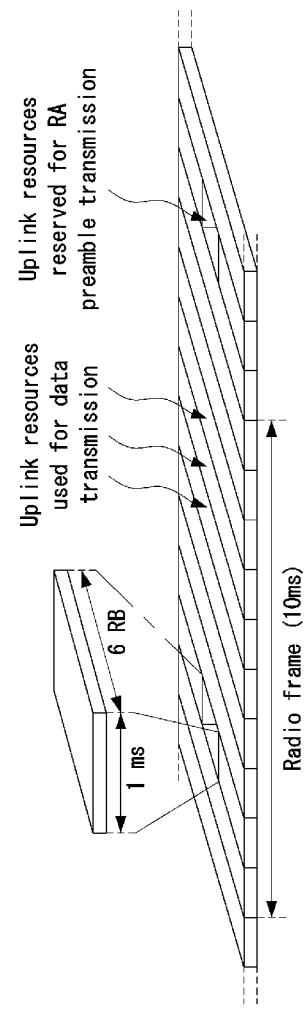
FIG. 4 is a conceptual diagram illustrating a first exemplary embodiment of a PRACH in a communication system.

FIG. 4 is a conceptual diagram illustrating a first exemplary embodiment of a PRACH in a communication system.

Referring to FIG. 4, a PRACH may be composed of one or more resource blocks (e.g., 6 resource blocks) in the frequency domain. The length of the RA preamble and the number of resource blocks (RBs) allocated to the PRACH (e.g., the number of RBs for PUSCH occupancy) may be defined as shown in Table 1 below.

TABLE 1

| $L_{RA}$ (PRACH preamble length) | $\Delta f_{RA}$ (kHz) (Subcarrier spacing for PRACH preamble) | $\Delta f$ (kHz) (Subcarrier spacing for PUSCH) | $N_{RB}^{RA}$ (Number of RBs allocated to PRACH (e.g., number of RBs for PUSCH occupancy) |
|---|---|---|---|
| 839 (Long sequence length) | 1.25 | 15 | 6 |
| | | 30 | 3 |
| | | 60 | 2 |
| | 5 | 15 | 24 |
| | | 30 | 12 |
| | | 60 | 6 |
| 139 (Short sequence length) | 15 | 15 | 12 |
| | | 30 | 6 |
| | | 60 | 3 |
| | 30 | 15 | 24 |
| | | 30 | 12 |
| | | 60 | 6 |
| | 60 | 60 | 12 |
| | | 120 | 6 |
| | 120 | 60 | 24 |
| | | 120 | 12 |

The number $N_{RB}^{RA}$ of RBs allocated to the PRACH (e.g., the number of RBs for PUSCH occupancy) may be determined based on the length $L_{RA}$ of the PRACH preamble, the subcarrier spacing $\Delta f_{RA}$ for the PRACH preamble, the subcarrier spacing $\Delta f$ for the PUSCH. According to various numerologies (e.g., the length of the PRACH preamble, the subcarrier spacing for the PRACH preamble, and/or the subcarrier spacing for the PUSCH), the size of PRACH radio resources (e.g., the number $N_{RB}^{RA}$ of RBs allocated to the PRACH) may be between a minimum of 3 RBs and a maximum of 24 RBs.

The proportion of PRACH resources in uplink resources may be high. As the proportion of PRACH resources increases, the cost may increase. Therefore, increasing the PRACH resources (e.g., RAOs) to improve the performance of the RA procedure may be limited.

The RAO may be allocated for each subframe or slot in consideration of an access latency, a load of the random access procedure, and/or a success probability of the random access procedure. Alternatively, in order to increase the transmission opportunities of the RA preamble, a plurality of RAOs may be configured within one subframe or one slot. In this case, the plurality of RAOs may be multiplexed in the frequency domain. As the number of RAOs increases in the communication system, resources to be used for transmission of other data, information, and/or signals may decrease. Therefore, the efficiency of resource use in the communication system may decrease.

The RAO may be configured by the base station. The RAO and RAPIdx may be maintained in a reserved state for a preconfigured time regardless of whether the corresponding RA preamble is actually transmitted. Since the RAO is maintained in a reserved state even when there is no RA preamble to be transmitted, radio resources may be wasted. In addition, when the number of RA preamble sequences is increased, reception complexity may increase.

Figure 5:
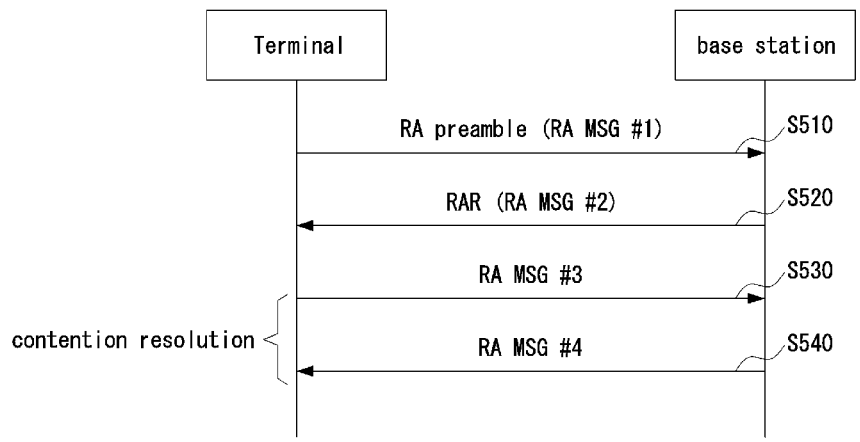
FIG. 5 is a sequence chart illustrating a first exemplary embodiment of a CBRA procedure in a communication system.

FIG. 5 is a sequence chart illustrating a first exemplary embodiment of a CBRA procedure in a communication system.

Referring to FIG. 5, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same as or similar to the communication node 200 shown in FIG. 2.

The terminal may receive a synchronization signal (e.g., synchronization signal/physical broadcast channel (SS/PBCH) block) from the base station, and acquire downlink frame synchronization (e.g., downlink timing) based on the synchronization signal. Particularly, the synchronization signal (e.g., SS/PBCH block) may include a primary synchronization signal (PSS) and a secondary synchronization signal (SSS). In addition, the terminal may obtain PRACH configuration information from system information (e.g., system information block (SIB)) received from the base station. The system information may be common configuration information for an unspecified user, and the RRC message may be dedicated configuration information for a specific user. The PRACH configuration information may include information indicating PRACH time-frequency resources, parameters required to generate RA preambles (e.g., configuration information of the preamble sets #0 and #1), and the like. Alternatively, the PRACH configuration information may be transmitted from the base station to the terminal through another message (e.g., RRC message) instead of the system information.

When the PRACH configuration information is obtained, a random access procedure may be performed. The random access procedure may be initialized by the base station. The terminal may randomly select one RA preamble sequence within the preamble set #0 or #1. The preamble set used by the terminal may be indicated by the base station. The terminal may generate an RA preamble by using the selected RA preamble sequence, and may transmit the generated RA preamble to the base station (S510). The RA preamble may be transmitted through a PRACH (e.g., RAO) configured by the base station. The RA preamble may be referred to as 'RA message (MSG) #1'.

The base station may receive the RA preamble by performing a monitoring operation on a PRACH (e.g., RAO). The base station may estimate a timing advance (TA) value for the corresponding terminal based on the received RA preamble. The TA value may be used to synchronize an uplink frame. The base station may generate a random access response (RAR) including the TA value and resource allocation information for transmission of an RA MSG #3, and transmit the RAR to the terminal (S520). The RAR may be referred to as 'RA MSG #2'. Alternatively, the RAR may be replaced with downlink control information (DCI) transmitted on a physical downlink control channel (PDCCH). In this case, the base station may transmit the DCI to the terminal in the step S520.

The terminal may receive the RAR from the base station and may acquire uplink frame synchronization based on the TA value included in the RAR. In case of a random access procedure performed for connecting to the communication system, the terminal may transmit an RA MSG #3 including a terminal identifier to the base station (S530). In case of a random access procedure performed after the terminal is connected to the communication system, the terminal may transmit an RA MSG #3 including an identifier (e.g., cell-radio network temporary identifier (C-RNTI)) allocated by the base station to the base station (S530).

The base station may receive the RA MSG #3 from the terminal. The base station may transmit an RA MSG #4 to the terminal in response to the RA MSG #3 (S540). The RA MSG #4 may include the identifier included in the RA MSG #3. When the RA MSG #4 is received from the base station, the terminal may determine that contention has been resolved. That is, the steps S530 and S540 may be performed for the contention resolution.

Figure 6:
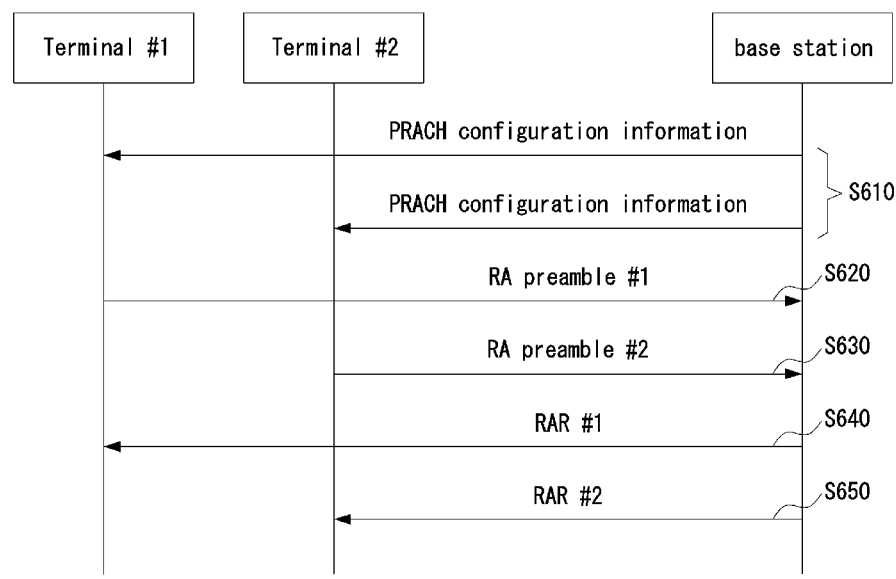
FIG. 6 is a sequence chart illustrating a first exemplary embodiment of a CFRA procedure in a communication system.

FIG. 6 is a sequence chart illustrating a first exemplary embodiment of a CFRA procedure in a communication system.

Referring to FIG. 6, a communication system may include a base station, a terminal #1, and a terminal #2. The base station may be the base station 110-1, 110-2, 110-3, 120-1, or 120-2 shown in FIG. 1, and each of the terminals #1 and #2 may be the terminal 130-1, 130-2, 130-3, 130-4, 130-5, or 130-6 shown in FIG. 1. The base station, the terminal #1, and the terminal #2 may be configured to be the same as or similar to the communication node 200 shown in FIG. 2.

The base station may transmit PRACH configuration information to the terminal #1 and the terminal #2, respectively (S610). The PRACH configuration information may indicate RA resources (e.g., RAO, RAPIdx). The RA resources for the terminal #1 may be different from the RA resources for the terminal #2. Since different RA resources are allocated to the terminals, there may be restriction on the number of terminals that can participate in the random access procedures in the communication environment in which RA resources are limited. The terminal #1 may generate an RA preamble #1 based on the PRACH configuration information obtained from the base station, and may transmit the generated RA preamble #1 to the base station through a PRACH configured by the base station (S620). The terminal #2 may generate an RA preamble #2 based on the PRACH configuration information obtained from the base station, and transmit the generated RA preamble #2 to the base station through a PRACH configured by the base station (S630).

An RA preamble sequence used to generate the RA preamble may be indicated by the PRACH configuration information (e.g., RAPIdx). The RA preamble sequence used to generate the RA preamble #1 may be different from the RA preamble sequence used to generate the RA preamble #2. The PRACH through which the RA preamble #1 is transmitted may be different from the PRACH through which the RA preamble #2 is transmitted. Alternatively, the PRACH through which the RA preamble #1 is transmitted may be the same as the PRACH through which the RA preamble #2 is transmitted.

The base station may receive the RA preamble #1 by monitoring the PRACH configured for the terminal #1. The base station may transmit an RAR #1 to the terminal #1 in response to the RA preamble #1 (S640). When the RAR #1 is received from the base station, the terminal #1 may determine that the random access procedure has been successfully completed. The base station may receive the RA preamble #2 by monitoring the PRACH configured for the terminal #2. The base station may transmit an RAR #2 to the terminal #2 in response to the RA preamble #2 (S650). When the RAR #2 is received from the base station, the terminal #2 may determine that the random access procedure has been successfully completed. When the RAR is not received within a preconfigured time, the terminal may perform the random access procedure again.

Figure 7:
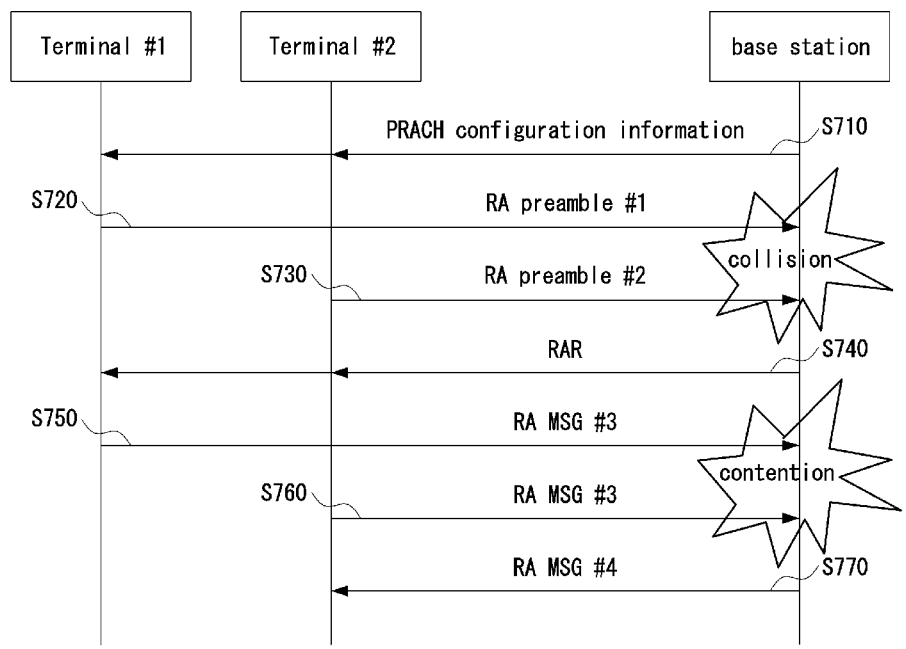
FIG. 7 is a sequence chart illustrating a second exemplary embodiment of a CBRA procedure in a communication system.

FIG. 7 is a sequence chart illustrating a second exemplary embodiment of a CBRA procedure in a communication system.

Referring to FIG. 7, a communication system may include a base station, a terminal #1, and a terminal #2. The base station may be the base station 110-1, 110-2, 110-3, 120-1, or 120-2 shown in FIG. 1, and each of the terminals #1 and #2 may be the terminal 130-1, 130-2, 130-3, 130-4, 130-5, or 130-6 shown in FIG. 1. The base station, the terminal #1, and the terminal #2 may be configured to be the same as or similar to the communication node 200 shown in FIG. 2.

The base station may transmit PRACH configuration information to the terminal #1 and the terminal #2, respectively (S710). The PRACH configuration information may indicate RA resources (e.g., RAO, RAPIdx, RSI). The RA resources (e.g., RAO, RAPIdx, RSI) may have a mapping relationship with each other. The RAPIdx may indicate one of the preamble sets #0 and #1 shown in FIG. 3. The RA resources for the terminal #1 may be the same as the RA resources for the terminal #2.

The terminal #1 may generate an RA preamble #1 based on the PRACH configuration information obtained from the base station. For example, the terminal #1 may select one RA preamble sequence within the preamble set indicated by the PRACH configuration information, and generate the RA preamble #1 by using the selected RA preamble sequence. The terminal #1 may transmit the RA preamble #1 through a PRACH indicated by the PRACH configuration information (S720).

The terminal #2 may generate an RA preamble #2 based on the PRACH configuration information obtained from the base station. For example, the terminal #2 may select one RA preamble sequence within the preamble set indicated by the PRACH configuration information, and generate the RA preamble #2 by using the selected RA preamble sequence. The terminal #2 may transmit the RA preamble #2 through a PRACH indicated by the PRACH configuration information (S730).

The RA preamble sequence used to generate the RA preamble #1 may be the same as the RA preamble sequence used to generate the RA preamble #2, and the PRACH through which the RA preamble #1 is transmitted may be the same as the PRACH through which the RA preamble #2 is transmitted. In this case, the RA preamble #1 may collide with the RA preamble #2. For example, the base station may not be able to distinguish between the RA preamble #1 and the RA preamble #2. Even though a plurality of RA preambles have been transmitted from the terminals #1 and #2, the base station may determine that one RA preamble has been transmitted.

Accordingly, the base station may transmit one RAR in response to the one RA preamble (S740). The RAR may include an identifier (i.e., RAPID) of the RA preamble sequence used to generate the RA preamble, resource allocation information for RA MSG #3 transmission, and the like. The RAR may be transmitted using a random access (RA)-RNTI determined based on time-frequency resources of the PRACH (e.g., RAO) through which the RA preamble is received. The terminal #1 and the terminal #2 may perform a monitoring operation for RAR reception by using the RA-RNTI determined based on the time-frequency resources of the PRACH (e.g., RAO) through which the corresponding RA preamble is transmitted.

Each of the terminal #1 and the terminal #2 may receive the RAR from the base station. The terminal #1 may transmit an RA MSG #3 including a terminal identifier (e.g., C-RNTI or UE contention resolution identity) for contention resolution) of the terminal #1 to the base station by using a resource indicated by the RAR (S750). The terminal #2 may transmit an RA MSG #3 including a terminal identifier (e.g., C-RNTI or UE contention resolution identity) for contention resolution) of the terminal #2 to the base station by using the resource indicated by the RAR (S760). That is, the resource through which the RA MSG #3 of the terminal #1 is transmitted may be the same as the resource through which the RA MSG #3 of the terminal #2 is transmitted. That is, the terminal #1 and the terminal #2 may attempt to access the base station using one RAR.

The base station may receive the RA MSG #3 of the terminal #1 or the terminal #2. When the RA MSG #3 of the terminal #2 is received, the base station may generate an RA MSG #4 including the identifier (e.g., C-RNTI or UE contention resolution identity) of the terminal #2, and transmit the RA MSG #4 (S770). The terminal #2 may receive the RA MSG #4 from the base station. Since the identifier (e.g., C-RNTI or UE contention resolution identity of the terminal #2) included in the RA MSG #4 is the same as the identifier of the terminal #2 transmitted through the RA MSG3, the terminal #2 may determine that the random access procedure has been successfully completed.

The terminal #1 may receive the RA MSG #4 from the base station. Since the identifier (e.g., C-RNTI or UE contention resolution identity of the terminal #2) included in the RA MSG #4 is different from the identifier of the terminal #1, the terminal #1 may determine that the random access procedure has failed. In this case, the terminal #1 may perform the random access procedure again. The terminal #1 may not know that the random access procedure has failed until the RA MSG #4 is received. When the random access procedure fails and the terminal #1 needs to perform the random access procedure again, the terminal #1 may retransmit an RA MSG 1 after a backoff time. In this case, an access latency may occur due to contention in the terminal #1.

Meanwhile, when a plurality of terminals transmit the same RA preambles (e.g., RA MSG 1) in the same PRACH resource (e.g., the same RAO) according to the CBRA procedure, a collision between the RA preambles may occur. In this case, the plurality of terminals may determine whether the CBRA procedure is successful based on a reception state of the RA MSG 4 for contention resolution. Therefore, it is not known that the random access procedure has succeeded until the reception of the RA MSG 4, and if the contention resolution of the RA MSG 3 fails, the random access procedure should be performed again. In this reason, an access latency through the RA procedure may occur due to the collision between the RA preambles. When a transmission load of the RA preamble increases, a success probability and a throughput of the RA procedure (e.g., CBRA procedure) may decrease due to the contention resolution failure. When a collision between the RA preambles is detected, the terminal(s) may retry the RA procedure after a preset time (e.g., backoff time) elapses. Accordingly, an access latency may occur due to the collision between the RA preambles and/or the contention resolution failure.

The terminal desiring to access the base station may perform a random access procedure by using RA resources. When a plurality of RA preambles generated using the same RA preamble sequence are transmitted on the same PRACH in the CFRA procedure and the CBRA procedure, success of the random access procedure according to only one RA preamble can be guaranteed, and random access procedure(s) according to the remaining RA preamble(s) may fail. That is, even when a plurality of RA preambles are transmitted on the same PRACH, the base station may transmit only one RAR in response to the plurality of RA preambles. Therefore, the success probability of the random access procedure may be reduced.

As the number of terminals performing the random access procedure increases, RA resources for the CFRA procedure may become insufficient, and accordingly, the terminal may perform the CBRA procedure instead of the CFRA procedure. In this case, the number of terminals performing the CBRA procedure increases, and accordingly, the success probability of the random access procedure may rapidly decrease. In order to improve the success probability of the random access procedure, the amount of RA resources may be increased. The RA resources may include the RAO, RAPIdx, and/or RSI. The RA resources (e.g., RAO, RAPIdx, and/or RSI) may have a mapping relationship with each other.

In order to increase the amount of RA resources, a method of increasing the number of RAOs may be considered. In this case, the number of RAOs (e.g., random access occasions) may increase in a specific time period (e.g., subframe or slot). However, since many radio resources are required for PRACHs, resource use efficiency may be degraded in the communication system.

In order to increase the amount of RA resources, a method of increasing the number of RA preamble sequences may be considered. When the number of RA preamble sequences selectable by the terminal is increased, the collision probability of the RA preambles may decrease. However, when the number of RA preamble sequences increases, reception complexity may increase in the base station that detects the RA preamble sequences, and processing time of the RA preamble sequences may increase.

When the random access procedure is performed using limited RA resources, a collision probability of RA preambles may increase as the number of terminals attempting random access increases. Accordingly, the random access procedure may be performed again due to a failure of random access, and an access latency may occur. In addition, when there are insufficient RA resources to be allocated to the terminal in the CFRA procedure, the corresponding terminal may perform the CBRA procedure instead of the CFRA procedure. In this case, since the terminal additionally performs the transmission/reception procedure of the RA MSGs #3 and #4, the execution time of the random access procedure may increase.

Meanwhile, when a beam failure is detected in the 5G communication system, a beam failure recovery (BFR) procedure may be performed. The BFR procedure may be performed through a dedicated channel (e.g., PRACH). The base station may transmit PRACH configuration information (e.g., dedicated RA resources) for the BFR procedure to the terminal. If the dedicated RA resources for the BFR procedure cannot be allocated due to lack of RA resources, the BFR procedure may be performed based on the CBRA procedure. In this case, the transmission/reception procedure of the RA MSGs #3 and #4 may be additionally performed, and accordingly, the execution time of the random access procedure may increase.

On the other hand, the RA procedure may be classified into a primary RA procedure and a secondary RA procedure. Depending on the type and/or purpose of random access, the primary RA procedure or the secondary RA procedure may be used. The primary RA procedure may be basically performed, and the secondary RA procedure may be a procedure performed supplementarily. For example, the primary RA procedure may be a 4-step RA procedure, and the secondary RA procedure may be a 2-step RA procedure. Alternatively, the primary RA procedure may be a 2-step RA procedure, and the secondary RA procedure may be a 4-step RA procedure. The base station may configure primary RA resources (e.g., RA preambles, RAOs, RSIs, etc.) for the primary RA procedure. In addition, the base station may configure secondary RA resources (e.g., RA preambles, RAOs, RSIs, etc.) for the secondary RA procedure. The secondary RA resources may be configured virtually. The secondary RA resources may be estimated based on the primary RA resources. For example, the base station and/or the terminal may estimate resources other than the primary RA resources as the secondary RA resources. The primary RA resources may be different from the secondary RA resources. For example, time resources (e.g., symbol(s), slot(s), mini-slot(s), subframe(s)) indicated by the primary RA resources may be different from time resources (e.g., symbol(s), slot(s), mini-slot(s), subframe(s)) indicated by the secondary RA resources. Frequency resources (e.g., carrier(s), subchannel(s), RB(s), bandwidth part(s) (BWP(s))) indicated by the primary RA resources may be different from frequency resources (e.g., carrier(s), subchannel(s), RB(s), bandwidth part(s) (BWP(s))) indicated by the secondary RA resources.

The base station may transmit configuration information (e.g., primary RA resources) for the primary RA procedure and/or configuration information (e.g., secondary RA resources) for the secondary RA procedure to the terminal. The configuration information for the primary RA procedure may be referred to as primary RA configuration information, and the configuration information for the secondary RA procedure may be referred to as secondary RA configuration information. The terminal may receive the primary RA configuration information and/or the secondary RA configuration information from the base station. When only the primary RA configuration information is received, the terminal may estimate the secondary RA resources based on the primary RA configuration information.

Among the primary RA procedure and the secondary RA procedure, the primary RA procedure may be preferentially performed. For example, the primary RA procedure may be the RA procedure shown in FIGS. 5 to 7. The terminal may perform the primary RA procedure based on the primary RA configuration information. That is, the terminal may transmit a primary RA preamble to the base station by using the primary RA resources. The base station may receive the primary RA preamble from the terminal. The base station may determine to perform the secondary RA procedure instead of the primary RA procedure when specific condition(s) are satisfied. If the specific condition(s) are not satisfied, the base station may perform the primary RA procedure. For example, the specific condition(s) may be as follows.

Condition 1: A failure probability of the primary RA procedure is high (e.g., the failure probability of the primary RA procedure is greater than or equal to a reference value)

Condition 2: RA preambles collide in the primary RA procedure

Condition 3: Primary RA resources are congested

Condition 4: Fast RA procedure is needed

If it is determined that the secondary RA procedure is performed instead of the primary RA procedure, the base station may transmit a DCI and/or RAR (e.g., primary RAR) including information indicating that the secondary RA procedure is to be performed. Here, a cyclic redundancy check (CRC) of the DCI may be scrambled by a primary-RA-RNTI determined based on a transmission resource of the primary RA preamble. The terminal may receive the DCI and/or RAR from the base station. When the received DCI and/or RAR includes the information indicating that the secondary RA procedure is to be performed, the terminal may determine that the secondary RA procedure is to be performed instead of the primary RA procedure. In this case, the terminal may transmit a secondary RA preamble to the base station by using the secondary RA resources. That is, the secondary RA preamble may be transmitted instead of an RA MSG 3 according to the primary RA procedure. The base station may receive the secondary RA preamble from the terminal, and may transmit a secondary RAR to the terminal in response thereto. The terminal may receive the secondary RAR, which is a response to the secondary RA preamble, from the base station.

FIG. 8 is a conceptual diagram illustrating a first exemplary embodiment of a method of configuring RAOs in a communication system.

Referring to FIG. 8, a slot #n may be configured as a PRACH slot, and in the PRACH slot, primary RAO(s) for the primary RA procedure and secondary RAO(s) for the secondary RA procedure may be configured. Seven RAOs may be configured within one PRACH slot. n may be an integer greater than or equal to 0. The primary RAO(s) may not overlap with the secondary RAO(s) in the time domain. The frequency resource(s) in which the primary RAO(s) are configured may be the same as the frequency resource(s) in which the secondary RAO(s) are configured. Alternatively, the frequency resource(s) in which the primary RAO(s) are configured may be different from the frequency resource(s) in which the secondary RAO(s) are configured.

In the exemplary embodiment shown in FIG. 8, resources in which the primary RAO(s) are not configured may be used for the secondary RAO(s). The secondary RAO(s) may be explicitly indicated to the terminal. Alternatively, the secondary RAO(s) may not be explicitly indicated to the terminal. In this case, the base station and/or the terminal may estimate that the resources not configured for the primary RAO(s) within the PRACH slot are the secondary RAO(s). Until execution of the secondary RA procedure is indicated, the secondary RAO(s) may be used for other uplink communication (e.g., physical uplink shared channel (PUSCH) transmission and/or physical uplink control channel (PUCCH) transmission). If execution of the secondary RA procedure is indicated, the secondary RAO(s) may be used as a PRACH for the secondary RA procedure. That is, the secondary-RAO(s) may be deactivated until the execution of the secondary RA procedure is indicated, and the secondary RAO(s) may be activated when the execution of the secondary RA procedure is indicated.

Alternatively, in the exemplary embodiment shown in FIG. 8, some resources in which the primary RAO(s) are configured may be used for the secondary RAO(s). The primary RAO(s) may overlap with the secondary RAO(s). The secondary RAO(s) may be explicitly indicated to the terminal. If execution of the secondary RA procedure is indicated, the secondary RAO(s) may be used as a PRACH for the secondary RA procedure. That is, when the primary RA procedure is performed, the RAO(s) within the slot #n may be used as the primary RAO(s). When the secondary RA procedure is performed, some RAO(s) among the primary RAO(s) within the slot #n may be used as the secondary RAO(s). The frequency resource(s) in which the primary RAO(s) are configured may be the same as the frequency resource(s) in which the secondary RAO(s) are configured.

FIG. 9 is a conceptual diagram illustrating a second exemplary embodiment of a method of configuring RAOs in a communication system.

Referring to FIG. 9, a slot #n and a slot #n+1 may be configured as PRACH slots, primary RAO(s) for the primary RA procedure may be configured in the slot #n, and secondary RAO(s) for the secondary RA procedure may be configured in the slot #n+1. That is, the slot #n may be a type1-PRACH slot, and the slot #n+1 may be a type2-PRACH slot. Seven RAOs may be configured within one PRACH slot. n may be an integer greater than or equal to 0. The slot #n and the slot #n+1 may be consecutive slots. Alternatively, the slot #n may not be contiguous with the slot #n+1. The frequency resource(s) in which the primary RAO(s) are configured may be the same as the frequency resource(s) in which the secondary RAO(s) are configured. Alternatively, the frequency resource(s) in which the primary RAO(s) are configured may be different from the frequency resource(s) in which the secondary RAO(s) are configured. When the frequency resource(s) in which the primary RAO(s) are configured are different from the frequency resource(s) in which the secondary RAO(s) are configured, the PRACH slots of the primary RAO(s) and the secondary RAO(s) may be configured in the same slot #n.

In the exemplary embodiment shown in FIG. 9, resources in which the primary RAO(s) are not configured may be used for the secondary RAO(s). Until execution of the secondary RA procedure is indicated, the secondary RAO(s) may be used for other uplink communication (e.g., PUSCH transmission and/or PUCCH transmission). If execution of the secondary RA procedure is indicated, the secondary RAO(s) may be used as a PRACH for the secondary RA procedure. That is, the secondary RAO(s) may be deactivated until the execution of the secondary RA procedure is indicated, and the secondary RAO(s) may be activated when the execution of the secondary RA procedure is indicated.

Figure 10:
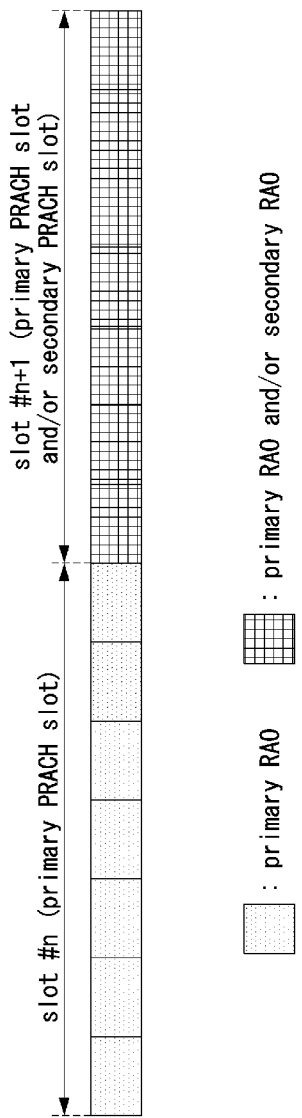
FIG. 10 is a conceptual diagram illustrating a third exemplary embodiment of a method of configuring RAOs in a communication system.

FIG. 10 is a conceptual diagram illustrating a third exemplary embodiment of a method of configuring RAOs in a communication system.

Referring to FIG. 10, a slot #n and a slot #n+1 may be configured as PRACH slots, and primary RAO(s) for the primary RA procedure may be configured within the slot #n and the slot #n+1. Seven RAOs may be configured within one PRACH slot. n may be an integer greater than or equal to 0. Secondary RAO(s) may be configured in one slot (e.g., slot #n+1) among the slot #n and the slot #n+1 in which the primary RAO(s) are configured. In the slot #n+1, the primary RAO(s) and the secondary RAO(s) may overlap each other. When the primary RA procedure is performed, the RAO(s) within the slot #n+1 may be used as the primary RAO(s). When the secondary RA procedure is performed, the RAO(s) within the slot #n+1 may be used as the secondary RAO(s).

The slot #n and the slot #n+1 may be consecutive slots. Alternatively, the slot #n may not be contiguous with the slot #n+1. The frequency resource(s) in which the primary RAO(s) are configured may be the same as the frequency resource(s) in which the secondary RAO(s) are configured. Alternatively, the frequency resource(s) in which the primary RAO(s) are configured may be different from the frequency resource(s) in which the secondary RAO(s) are configured.

Figure 11:
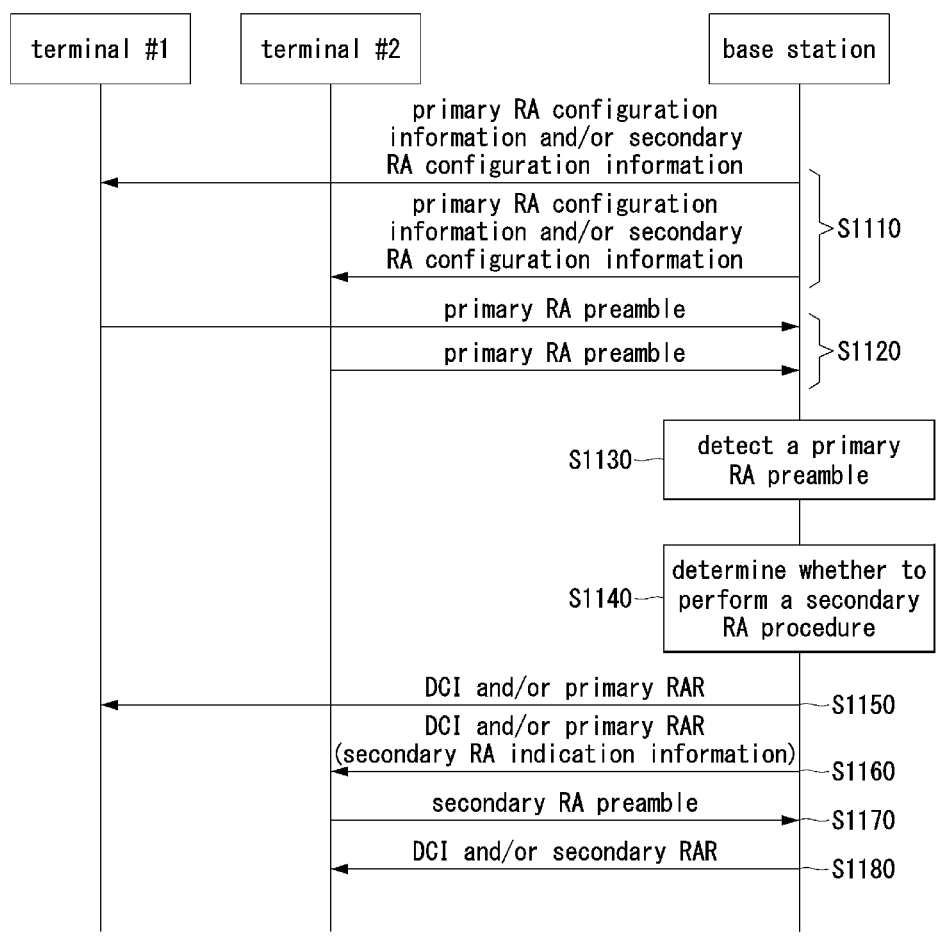
FIG. 11 is a sequence chart illustrating a third exemplary embodiment of a contention-based random access (CBRA) procedure in a communication system.

FIG. 11 is a sequence chart illustrating a third exemplary embodiment of a contention-based random access (CBRA) procedure in a communication system.

Referring to FIG. 11, a communication system may include a base station, a terminal #1, and a terminal #2. The base station may be the base station 110-1, 110-2, 110-3, 120-1, or 120-2 shown in FIG. 1, and each of the terminal #1 and the terminal #2 may be the terminal 130-1, 130-2, 130-3, 130-4, 130-5, or 130-6 shown in FIG. 1. The base station, the terminal #1, and the terminal #2 may be configured identically as or similarly to the communication node 200 shown in FIG. 2.

The base station may generate primary RA configuration information and/or secondary RA configuration information. The primary RA configuration information may include information on primary RA resources (e.g., RA preamble(s), RAO(s), RSI(s), etc.), and the secondary RA configuration information includes information on secondary RA resources (e.g., RA preamble(s), RAO(s), RSI(s), etc.). The primary RA resources and the secondary RA resources may be configured based on the exemplary embodiments shown in FIGS. 8 to 10. The primary RA resources (e.g., RA preamble(s), RAO(s), RSI(s), etc.) may have a mapping relationship with each other. The secondary RA resources (e.g., RA preamble(s), RAO(s), RSI(s), etc.) may have a mapping relationship with each other. The secondary RA resources may be configured based on the primary RA resources. The secondary RA resources may be distinguished from the primary RA resources.

The base station may transmit the primary RA configuration information by using at least one of system information and RRC message (S1110). In addition, the base station may transmit the secondary RA configuration information by using at least one of system information, RRC message, MAC CE, DCI, or RAR. The secondary RA configuration information may be transmitted together with the primary RA configuration information in the step S1110. Alternatively, the secondary RA configuration information may be transmitted independently of the primary RA configuration information. The system information may be a system information block (SIB). The RRC message may be a cell-specific RRC message or a terminal-specific (i.e., UE-specific) RRC message. The RRC message may be indicated by a C-RNTI allocated exclusively for the terminal. The DCI through which the secondary RA configuration information is transmitted may be a DCI scrambled by the primary-RA-RNTI according to the primary RA procedure. The RAR through which the secondary RA configuration information is transmitted may be the primary RAR according to the primary RA procedure.

The terminals #1 and #2 may receive the primary RA configuration information and/or the secondary RA configuration information from the base station. Each of the terminals #1 and #2 may transmit a primary RA preamble to the base station by using primary RA resources indicated by the primary RA configuration information (S1120). The primary RA preamble may be an RA MSG 1 according to the 4-step RA procedure or an RA MSG A according to the 2-step RA procedure. The base station may detect the primary RA preamble by performing a monitoring operation on type 1 resources indicated by the primary RA configuration information (S1130). For example, in the step S1130, the base station may detect the primary RA preamble of the terminal #1 and the primary RA preamble of the terminal #2. When the primary RA preamble of the terminal #1 and the primary RA preamble of the terminal #2 are transmitted using the same primary RA resource, the primary RA preamble of the terminal #1 may collide with the primary RA preamble of the terminal #2.

After performing the step S1130, the base station may determine whether to perform the secondary RA procedure (S1140). The base station may determine that the secondary RA procedure is to be performed when specific condition(s) are satisfied. For example, the specific condition(s) may be at least one of 'when a probability of failure of the primary RA procedure is high', 'when the RA preambles collide in the primary RA procedure', 'when the primary RA resources are congested', or 'when a fast RA procedure is required'. The base station may determine that the primary RA procedure is to be performed for the terminal #1 and may determine that the secondary RA procedure is to be performed for the terminal #2.

The base station may transmit a DCI and/or primary RAR to the terminal #1 (S1150). The DCI may indicate a transmission resource of the primary RAR. A CRC of the DCI may be scrambled by a primary RA-RTNI determined based on a transmission resource of the primary RA preamble of the terminal #1. The primary RAR may be an RA MSG 2 according to the 4-step RA procedure or an RA MSG B according to the 2-step RA procedure. The terminal #1 may receive the DCI and/or primary RAR from the base station. For example, the terminal #1 may receive the DCI from the base station by using the primary RA-RNTI, and may receive the primary RAR from the base station in the transmission resource indicated by the DCI. When the step 4 RA procedure is performed, a procedure of exchanging RA MSGs 3 and 4 between the terminal #1 and the base station may be performed after the step S1150 is performed.

The base station may transmit a DCI and/or primary RAR to the terminal #2 (S1160). The DCI may indicate a transmission resource of the primary RAR. A CRC of the DCI may be scrambled by a primary RA-RTNI determined based on a transmission resource of the primary RA preamble of the terminal #2 or a cell (C)-RNTI allocated exclusively to the terminal #2. The DCI may include the secondary RA configuration information, secondary RA indication information, and/or secondary RA valid time information. If the secondary RA configuration information is not transmitted in the step S1110, the DCI in the step S1160 may include the secondary RA configuration information. The secondary RA indication information may indicate that the secondary RA procedure is to be performed. When the secondary RA indication information is transmitted, the secondary RA resources according to the secondary RA configuration information may be activated (e.g., enabled). When a secondary RA valid time is configured, states of the secondary RA resources may be maintained in an activated (e.g., enabled) state during the corresponding valid time. That is, the secondary RA resources may be used during the corresponding valid time.

The secondary RA configuration information may be transmitted through the step S1110 or DCI, and the secondary RA indication information or (secondary RA indication information and secondary RA valid time information) may be included in the DCI. In this case, the primary RAR may not be transmitted in the step S1160. Alternatively, the secondary RA configuration information may be transmitted through the step S1110 or DCI, the secondary RA indication information or (secondary RA indication information and secondary RA valid time information) may be included in the primary RAR. In this case, both the DCI and the primary RAR may be transmitted in the step S1160. Alternatively, the (secondary RA configuration information and secondary RA indication information) or (secondary RA configuration information, secondary RA indication information, and secondary RA valid time information) may be included in the primary RAR.

In addition, as another method, the secondary RA configuration information may not be transmitted through the step S1110, and the secondary RA indication information may be transmitted through the DCI or primary RAR. In this case, the secondary RA indication information may further include the secondary RA configuration information.

In the step S1160, the terminal #2 may receive the DCI and/or primary-RAR from the base station. That is, the terminal #2 may receive the secondary RA configuration information, secondary RA indication information, and/or secondary RA valid time information. When the secondary RA indication information is received, the terminal #2 may determine that the secondary RA resources according to the secondary RA configuration information are activated (e.g., enabled). When the secondary RA valid time is configured, the terminal may determine that the secondary RA resources are activated (e.g., enabled) during the corresponding valid time. Therefore, the terminal #2 may perform the secondary RA procedure instead of the primary RA procedure.

The secondary RA indication information may include at least one of an indicator indicating whether the secondary RA procedure is activated, the secondary RA resources (PRACH occasion(s), RA preamble index(es), or RSI(s)) dedicated to the secondary RA procedure, a terminal identifier, or a terminal group identifier.

The terminal #2 may transmit a secondary RA preamble to the base station by using the secondary RA resources (S1170). In the 4-step RA procedure, the secondary RA preamble may be an RA MSG 1. In the 2-step RA procedure, the secondary RA preamble may be an RA MSG A. The base station may receive the secondary RA preamble of the terminal #2 by performing a monitoring operation on the secondary RA resources. The base station may transmit a secondary RAR for the secondary RA preamble to the terminal #2 (S1180). For example, in the step S1180, the base station may transmit a DCI and/or secondary-RAR to the terminal #2. The DCI may indicate a transmission resource of the secondary RAR, and a CRC of the DCI may be scrambled by a secondary-RA-RNTI determined based on a transmission resource of the secondary RA preamble. In the 4-step RA procedure, the secondary RAR may be an RA MSG 2. In the 2-step RA procedure, the secondary RAR may be an RA MSG B.

The terminal #2 may receive the DCI and/or secondary RAR from the base station. For example, the terminal #2 may receive the DCI from the base station by using the secondary-RA-RNTI, and may receive the secondary RAR from the base station in the transmission resource indicated by the DCI. When the 4-step RA procedure is performed, after the step S1180 is performed, a procedure of exchanging RA MSGs 3 and 4 between the terminal #2 and the base station may be performed.

According to the above-described exemplary embodiments, the secondary RA resources may be dynamically configured without increasing RA resources according to a need or load of the RA procedure in the communication system. The secondary RA resources may be supplementary resources. In this case, waste of uplink resources may be reduced. The secondary RA resources may be configured according to the characteristics of the terminal, and thus contention may be distributed in the RA procedure, and a transmission opportunity of the RA preamble may be increased. Accordingly, a success probability of the RA procedure may be increased, and the reliability and performance of the communication system may be improved. When the number of terminals performing the RA procedure increases, RA resources for the CFRA procedure may be insufficient. The secondary RA resources may be used supplementarily, so that the success probability of the RA procedure may be improved, and a beam failure recovery procedure and/or a radio link failure (RLF) recovery procedure may be performed quickly.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving, from a base station, primary random access (RA) configuration information for a primary RA procedure;
receiving, from the base station, secondary RA configuration information for a secondary RA procedure;
transmitting a primary RA preamble to the base station by using a primary RA resource indicated by the primary RA configuration information;
receiving, from the base station, secondary RA indication information in response to the primary RA preamble, the secondary RA indication information indicating to perform the secondary RA procedure instead of the primary RA procedure; and
transmitting a secondary RA preamble to the base station by using a secondary RA resource indicated by the secondary RA configuration information,
wherein the secondary RA resource activated by the secondary RA indication information is used during a valid time indicated by secondary RA valid time information configured by the base station.

2. The operation method according to claim 1, wherein the secondary RA configuration information is received from the base station before transmitting the primary RA preamble, before receiving a response to the primary RA preamble, or in a procedure of receiving the response to the primary RA preamble.

3. The operation method according to claim 1, wherein each of the primary RA resource and the secondary RA resource includes at least one of a physical random access channel (PRACH) occasion, an RA preamble index, or a reference signal index (RSI).

4. The operation method according to claim 1, wherein the secondary RA resource is configured independently of the primary RA resource, or the secondary RA resource is configured to overlap the primary RA resource.

5. The operation method according to claim 1, wherein the secondary RA configuration information is received through at least one of system information, a radio resource control (RRC) message, a medium access control (MAC) control element (CE), a primary random access response (RAR) that is a response to the primary RA preamble, or downlink control information (DCI).

6. The operation method according to claim 1, wherein the secondary RA indication information is included in a DCI scrambled by an RA-radio network temporary identifier (RA-RNTI) determined based on a transmission resource of the primary RA preamble or is included in a primary RAR that is a response to the primary RA preamble.

7. The operation method according to claim 1, wherein the secondary RA resource indicated by the secondary RA configuration information is activated when the secondary RA indication information is received.

8. The operation method according to claim 7, further comprising receiving the secondary RA valid time information from the base station.

9. An operation method of a base station in a communication system, the operation method comprising:
   transmitting primary random access (RA) configuration information for a primary RA procedure;
   transmitting secondary RA configuration information for a secondary RA procedure;
   receiving a primary RA preamble from a terminal by using a primary RA resource indicated by the primary RA configuration information;
   transmitting secondary RA indication information to the terminal, the secondary RA indication information indicating to perform the secondary RA procedure instead of the primary RA procedure; and
   receiving a secondary RA preamble from the terminal by using a secondary RA resource indicated by the secondary RA configuration information,
   wherein the secondary RA resource activated by the secondary RA indication information is used during a valid time indicated by secondary RA valid time information configured by the base station.

10. The operation method according to claim 9, wherein the secondary RA configuration information is transmitted to the terminal before receiving the primary RA preamble, before transmitting a response to the primary RA preamble, or in a procedure of transmitting the response to the primary RA preamble.

11. The operation method according to claim 9, wherein each of the primary RA resource and the secondary RA resource includes at least one of a physical random access channel (PRACH) occasion, an RA preamble index, or a reference signal index (RSI).

12. The operation method according to claim 9, wherein the secondary RA configuration information is transmitted through at least one of system information, a radio resource control (RRC) message, a medium access control (MAC) control element (CE), or downlink control information (DCI).

13. The operation method according to claim 9, wherein the secondary RA indication information is transmitted through a DCI scrambled by an RA-radio network temporary identifier (RA-RNTI) determined based on a transmission resource of the primary RA preamble or through a primary random access response (RAR) that is a response to the primary RA preamble.

14. The operation method according to claim 9, wherein the secondary RA resource indicated by the secondary RA configuration information is activated when the secondary RA indication information is transmitted.

15. The operation method according to claim 9, further comprising transmitting the secondary RA valid time information.

16. A terminal in a communication system, the terminal comprising:
   a processor;
   a memory electronically communicating with the processor; and
   instructions stored in the memory,
   wherein when executed by the processor, the instructions cause the terminal to:
   receive, from a base station, primary random access (RA) configuration information for a primary RA procedure;
   receive, from the base station, secondary RA configuration information for a secondary RA procedure;
   transmit a primary RA preamble to the base station by using a primary RA resource indicated by the primary RA configuration information;
   receive, from the base station, downlink control information (DCI) including secondary RA indication information in response to the primary RA preamble, the secondary RA indication information indicating to perform the secondary RA procedure instead of the primary RA procedure, and the DCI being scrambled by an RA-radio network temporary identifier (RA-RNTI) determined based on a transmission resource of the primary RA preamble; and
   transmit a secondary RA preamble to the base station by using a secondary RA resource indicated by the secondary RA configuration information.

17. The terminal according to claim 16, wherein the instructions further cause the terminal to receive secondary RA valid time information from the base station, and when the secondary RA indication information is received, the secondary RA resource is activated during a valid time indicated by the secondary RA valid time information.

* * * * *